United States Patent [19]

Neff et al.

[11] 4,214,668
[45] Jul. 29, 1980

[54] ELECTRICAL BOX AND MOUNTING BRACKET ASSEMBLY

[75] Inventors: Steve W. Neff, Clinton, Iowa; Harold T. Pate, Solon, Ohio

[73] Assignee: Indian Head Inc., New York, N.Y.

[21] Appl. No.: 13,152

[22] Filed: Feb. 21, 1979

[51] Int. Cl.² .......................... H02G 3/08; F16B 2/24
[52] U.S. Cl. ....................................... 220/3.3; 174/58; 220/3.9; 248/DIG. 6
[58] Field of Search ................... 220/3.3, 3.6, 3.9, 3.92; 248/DIG. 6; 174/58

[56] References Cited

U.S. PATENT DOCUMENTS

| | | | |
|---|---|---|---|
| 1,026,164 | 5/1912 | Hoffmann | 220/3.9 |
| 1,154,576 | 9/1915 | Maison et al. | 220/3.92 |
| 1,853,203 | 4/1932 | Cluny | 220/3.9 |
| 2,406,587 | 8/1946 | Cooper | 220/3.9 |
| 3,575,313 | 4/1971 | Trachtenberg | 220/3.3 |
| 3,834,658 | 9/1974 | Theodorides | 220/3.9 X |
| 3,863,037 | 1/1975 | Schindler et al. | 174/58 |
| 4,019,647 | 4/1977 | Arnold | 174/58 X |
| 4,062,470 | 12/1977 | Boteler | 220/3.3 |

Primary Examiner—Allan N. Shoap
Attorney, Agent, or Firm—William R. Laney

[57] ABSTRACT

An electrical outlet box mounting bracket assembly including a box of generally rectangular parallelepiped configuration, a pair of spaced channel elements on a side of the box, and an L-shaped bracket including a flange having side edges extending into the channels to engage the bracket with the box. The bracket further includes a pair of flexible tongues adjacent the side edges of the flange, which tongues engage tabs at the ends of the channels.

8 Claims, 3 Drawing Figures

U.S. Patent    Jul. 29, 1980    4,214,668
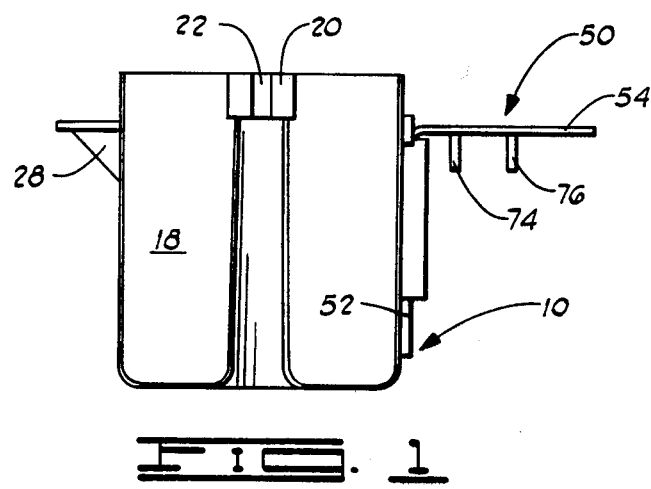
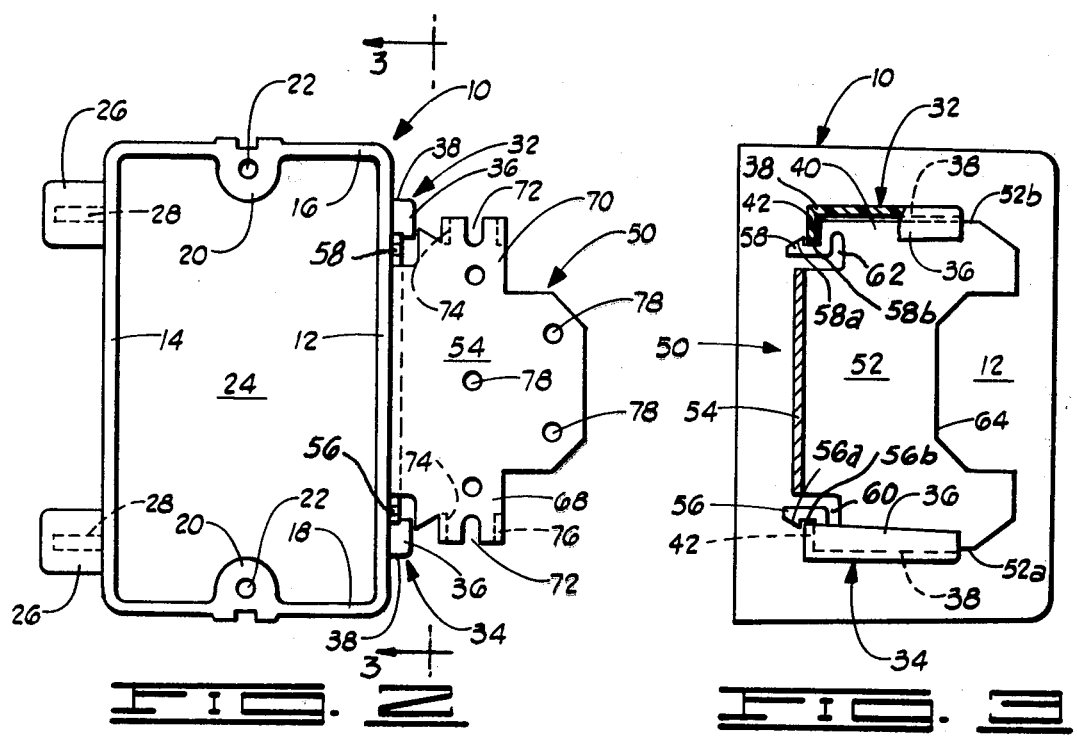

ELECTRICAL BOX AND MOUNTING BRACKET ASSEMBLY

BACKGROUND OF THE INVENTION

1. Field of the Invention

This invention relates to assemblies by which electrical terminal and outlet boxes can be mounted at an accessible location in a wall or other structure, and more particularly, to an electrical outlet box and associated mounting bracket which can be employed to mount the box by means of the bracket on a supporting structure, such as a wall stud or stringer alongside the box.

2. Brief Description of the Prior Art

Boteler U.S. Pat. No. 4,062,470 describes and illustrates an electrical outlet box mounting assembly in which a rectangularly cross-sectioned electrical outlet box is secured to a wooden stud by nails or screws. The assembly includes an L-shaped mounting bracket which can be snap locked in engagement with a side wall of the electrical box. Snap locking of the mounting bracket in engagement with the box is effected by means of a resilient wedge shaped body formed on one side of the box which snaps into a mating and complementary shaped slot formed in one of the legs of the generally L-shaped bracket. The side edges of this leg of the bracket slip into channels formed as undercuts in spaced channel elements also secured to one side of the electrical box. The channels are closed at one end by transverse portions which project from the side of the box and are positionally interposed in the path of movement of the leg of the bracket which is adjacent the box so as to prevent movement of the bracket in one direction. The wedge shaped body, when snapped into position in the opening formed in the bracket leg, prevents removal of the mounting bracket by sliding it in the opposite direction.

BRIEF DESCRIPTION OF THE PRESENT INVENTION

The present invention includes an electrical outlet box and an associated mounting bracket which is engaged with the side of the box, and which includes a flange extending normal to the side of the box and adapted for securement to a supporting structure.

In greater detail, the electrical box and mounting bracket assembly of the invention includes a synthetic resin electrical box having a plurality of side walls, a bottom and an open side opposite the bottom. On one of the side walls, a pair of spaced channel elements are provided and function to provide the point of attachment of one leg or flange of a mounting bracket. This flange of the mounting bracket has a pair of opposed side edges which project into the channel elements. A pair of flexible tongues are formed at opposite sides of this flange of the mounting bracket, and these tongues yield to snap over and engage a pair of tabs disposed at aligned ends of the two channel elements.

An object of the present invention is to provide an improved electrical box and mounting bracket assembly which facilitates the support and mounting of an electrical outlet box at a location adjacent a wall stud or similar structural element, using an outwardly projecting flange of the bracket to secure the electrical box in a fixed and desired location spaced from the structural member.

A further object of the invention is to provide an assembly of an electrical outlet box and mounting bracket which is constructed so that the box can be quickly snapped over a flange constituting a part of the bracket, and thereafter be securely fixed on the bracket for mounting purposes.

A further object of the invention is to provide an electrical outlet box and mounting bracket assembly which is relatively economically constructed and includes only two parts, one a synthetic resin molded electrical box, and the other an L-shaped angle bracket which can be quickly engaged with the electrical outlet box.

Additional objects and advantages will become apparent as the following detailed description of the invention is read in conjunction with the accompanying drawings which illustrate a preferred embodiment of the invention.

GENERAL DESCRIPTION OF THE DRAWINGS

FIG. 1 is an end elevation view of the electrical outlet box and mounting bracket assembly of the invention, depicting the mounting bracket engaged with one side of the electrical outlet box.

FIG. 2 is a plan view of the electrical outlet box and mounting bracket assembly as it appears when viewed from above.

FIG. 3 is a sectional view taken along line 3—3 of FIG. 1, and having a portion of one of the channel elements forming a part of the assembly broken away to facilitate illustration of a part of the mounting bracket which is utilized in the assembly.

DETAILED DESCRIPTION OF A PREFERRED EMBODIMENT OF THE INVENTION

Referring initially to FIG. 1 of the drawings, an electrical outlet box is illustrated therein and is designated generally by reference numeral 10. The electrical outlet box 10 includes, in the depicted form, a pair of opposed side walls 12 and 14 and a pair of opposed end walls 16 and 18. The end walls are provided with lugs 20 which, in accordance with conventional structure, are apertured as shown at 22 to permit cover plate fastening screws to be extended through the apertures to secure a cover plate across the open side of the box 10. The box 10 is further provided with a base wall 24 which is located opposite the open side of the box. The box is preferably formed as a unitary molded structure of synthetic resin.

Attached to the side wall 14 and projecting outwardly therefrom are a pair of stop plates 26 which function to index or locate the box relative to a dry wall element, such as a panel of sheetrock or other structure with respect to which the box is mounted so as to have the opening into the box flush with, or positioned slightly inwardly from, the finished interior side of a wall or ceiling in which it is mounted. The stop plates 26 prevent the box 10 from rotating about the locus of securement of the mounting bracket used in association therewith, and hereinafter described, to a wall stud. The stop plates 26 are reinforced and supported by gusset plates 28 extending between the underside of the respective stop plate and the side wall 14 of the box 10.

Secured to the outer side of the side wall 12 of the box 10 are a pair of elongated channel elements designated generally by reference numerals 32 and 34. Each of the channel elements 32 and 34 includes a retention plate 36 which extends parallel to the side wall 12 and is secured thereto and spaced therefrom by a spacer plate 38. The spacer plate 38 is formed integrally with the retention plate 36 and extends from the retention plate along one edge thereof so that an opening or channel space 40 is thereby provided between the retention plate and the side wall 12. At one end of each of the channel elements 32 and 34 which is the respective end closest to the open side of the box 10, each channel element includes an engaging tab 42 which projects transversely across the space 40 and is secured to the underside of the retention plate 36 and to one end of the spacer plate 38.

The mounting bracket forming a portion of the box and bracket assembly is designated generally by reference numeral 50. The mounting bracket is of L-shaped configuration and includes an engaging flange 52 and a mounting flange 54. It will be noted in referring to FIG. 3 that the engaging flange 52 includes a pair of opposed, substantially parallel side edges 52a and 52b. When the mounting bracket 50 is engaged with the electrical outlet box 10, these side edges project into the spaces 40 and are retained in this position by the retention plates 36.

The engaging flange 52 is joined to the mounting flange 54 along a bend line adjacent the ends of the channel elements 32 and 34 where the engaging tabs 42 are located. At this end of each of the side edges 52a and 52b, the engaging flange 52 has a pair of flexible tongues 56 and 58 formed thereon as shown in FIG. 3. It will be noted that these flexible tongues 56 and 58 are spaced from the main body of the retaining flange 52 by L-shaped slots 60 and 62, respectively. Due to the configuration and location of these slots, the flexible tongues 56 and 58 can be flexed inwardly from the side edges 52a and 52b toward the central portion of the retaining flange 52. The flexible tongues 56 and 58 include beveled edges 56a and 58a, respectively, and undercuts or notches 56b and 58b.

In securing the mounting bracket 50 to the electrical outlet box 10, the flexible tongues 56 and 58, which are inset from the outer side edges 52a and 52b, are first passed upwardly into the channel spaces 40 which characterize each of the channel elements 32 and 34, and the flexible tongues are followed into the channel spaces 40 by the side elements 52a and 52b which extend to a location closely adjacent the spacer plates 38 of the channel elements. Further movement of the flange 52 along the side wall 12 of the box 10 in the direction of the open side of the box ultimately brings the beveled edges 56a and 58a of the flexible tongues 56 and 58 against the inner edges of the engaging tabs 42 of the two channel elements 32 and 34. The mounting bracket 50 is then snapped into position by pushing up on a lower edge 64 of the flange 52 to flex the flexible tongues 56 and 58 inwardly and toward each other until the engaging tabs 42 snap into the notches 56b and 58b. When this occurs, the mounting bracket 50 is firmly interlocked with the channel elements 32 and 34 which are preferably molded integrally with the side wall 12 of the box 10.

As shown in FIG. 2, the mounting flange 54 of the mounting bracket 52 includes a pair of outwardly extending side plates 68 and 70. Each of the side plates 68 and 70 defines an inwardly extending generally U-shaped recess 72, and at its opposite edges carries a pair of downwardly extending, substantially parallel barbs 74 and 76. The barbs 74 and 76 project along the side plates 68 and 70 at opposite sides of the U-shaped slot or recess 72 formed in each of the side plates. A plurality of nail or screw holes 78 are provided to extend through the mounting flange 54 at various locations thereon to facilitate securement of the mounting flange to a wall stud, joist or other structural element.

In the utilization of the outlet box mounting bracket assembly of the invention, the mounting bracket 50 is first secured to the side wall 12 of the box 10 in the manner hereinbefore described so that it is snapped into engagement with the channel elements 32 and 34. In this position, the mounting flange 54 projects normal to the side wall 12, and it will be noted that this mounting flange lies in a plane which is substantially coplanar with the upper surfaces of the two stop plates 26 and 28. With the mounting bracket 50 engaged to the box 10, the box can then be mounted in a wall under construction by driving the barbs 74 and 76 either into a wooden stud, or through a light gauge steel wall stud. In the latter case, after penetrating this stud, the barbs 74 and 76 carried on the two side plates 68 and 70 of the mounting flange 54 can be crimped or bent over to, in effect, staple the mounting flange to the stud. It is then often desirable to extend sheet metal screws or wood screws, as may be appropriate, into the wall stud through the screw holes 76 and 78 carried in the mounting flange 54.

When the outlet box and mounting bracket assembly is so mounted on the wall stud, the finishing panels, such as sheetrock or the like, can then be affixed to the wall studs, and the outlet opening of the box 10 is positioned properly with respect to an opening cut through the sheetrock to permit a face plate or the like to be secured to the open side of the box, thereby allowing electrical plugs to be plugged into the face plate for electrical contact with contacts carried inside the box. The stop plates 26 and 28 assure that the box will not rotate about its point of connection to the stud through the mounting flange 54, and thus become misaligned with the planar inner or finished surface of the sheetrock or other bare wall finishing member.

Although a preferred embodiment of the invention has been herein described in order to illustrate the principles which underlie the invention, it will be understood that various changes can be effected in the described and illustrated construction without departure from these basic principles. Changes of this type are therefore deemed to be circumscribed by the spirit and scope of the invention except as the same may be necessarily limited by the appended claims or reasonable equivalents thereof.

What is claimed is:

1. An electrical outlet box and mounting bracket assembly comprising:
   a synthetic resin box forming an open-sided enclosure having at least one side wall;
   a pair of spaced channel elements on said side wall, each of said channel elements defining a respective channel space and including:
   a retention plate extending substantially parallel to said side wall;
   a spacer plate projecting between and interconnecting the retention plate and the side wall; and
   an engaging tab projecting normal to said retention plate and to said spacer plate at one end of the respective channel space, the distance separating the engaging tabs being less than the distance separating the spacer plates; and
   an L-shaped bracket including:
   an engaging flange having a first edge and having side edges extending into the channel elements at a location between the box and the respective retention plates of the channel elements into which the respective side edges extend;

a mounting flange extending normal to the plane of the engaging flange and having one edge thereof connected to said first edge of said engaging flange; and flexible, resilient tongue means connected to said engaging flange adjacent its first edge connected to said mounting flange and engaging said engaging tabs to prevent movement of said bracket in a direction normal to the plane of said mounting flange, said tongue means including undercuts receiving said engaging tabs.

2. An electrical outlet box and mounting bracket assembly as defined in claim 1 wherein said box is of right parallelepiped configuration.

3. An electrical outlet box and mounting bracket assembly as defined in claim 1 wherein said tongue means comprises a pair of flexible tongues located adjacent the opposite sides of said engaging flange, and each having an undercut therein and each positioned at one end of one of said side edges adjacent said mounting flange at a position to pass over and snap interlock with an adjacent one of said engaging tabs as said one tab snaps into the undercut in the respective interlocked tongue.

4. An electrical outlet box and mounting bracket assembly as defined in claim 3 wherein said tongues are spaced from each other by a distance less than the distance which separates said side edges.

5. An electrical outlet box and mounting bracket assembly as defined in claim 4 wherein each of said tongues includes a beveled edge, and the beveled edges of said tongues are spaced from each other substantially the same distance as said engaging tabs are spaced from each other.

6. An electrical outlet box and mounting bracket assembly as defined in claim 1 wherein said mounting flange has a plurality of fastener holes therethrough and further includes:

a pair of outwardly extending side plates on opposite sides of the mounting flange, and each defining a recess extending inwardly therein toward the other of the side plates; and a pair of substantially parallel, spaced tabs projecting normal to the plane of each of the side plates with each of said pairs of tabs including tabs positioned on opposite sides of the respective side plate-defined recess.

7. An electrical outlet box and mounting bracket assembly as defined in claim 6 wherein said box is a right parallelepiped.

8. An electrical outlet box and mounting bracket assembly as defined in claim 6 wherein said tongue means includes two spaced, flexible resilient tongues each having a pair of notches formed therein and receiving one of said engaging tabs in one of said notches.

* * * * *